United States Patent [19]

Imai et al.

[11] 4,404,268
[45] Sep. 13, 1983

[54] SOLID STATE LITHIUM CELL

[75] Inventors: Atsuo Imai; Shigeru Matake, both of Yokohama, Japan

[73] Assignee: Tokyo Shibaura Denki Kabushiki Kaisha, Kawasaka, Japan

[21] Appl. No.: 320,883

[22] Filed: Nov. 13, 1981

[30] Foreign Application Priority Data

Nov. 26, 1980 [JP] Japan .................. 55-165282

[51] Int. Cl.³ .............................. H01M 6/18
[52] U.S. Cl. ................... 429/191; 429/218
[58] Field of Search ............ 429/191, 124, 225, 226, 429/218

[56] References Cited

U.S. PATENT DOCUMENTS 3,959,012  5/1976  Liang et al. ............ 429/225
4,234,554  11/1980 Rebenau et al. ........ 429/191
4,258,109  3/1981  Liang et al. ............ 429/191
4,309,491  1/1982  Brec et al. .............. 429/218

FOREIGN PATENT DOCUMENTS 1603154  11/1981  United Kingdom.

OTHER PUBLICATIONS

Equilibrium Phases Between $Li_2S$ and FeS, vol. 123, No. 4, pp. 453–458 (1976).

Primary Examiner—Donald L. Walton
Attorney, Agent, or Firm—Schwartz, Jeffery, Schwaab, Mack, Blumenthal & Koch

[57] ABSTRACT

Disclosed is a solid state lithium cell comprising layers of a cathode-active material, a solid electrolyte, and an anode-active material consisting of lithium metal, which are arranged in this order, which is characterized in that said cathode-active material is a solid solution composed of lead iodide and at least one element selected from the group consisting of bismuth, antimony, thallium, indium and gallium and iodides thereof.

8 Claims, 3 Drawing Figures

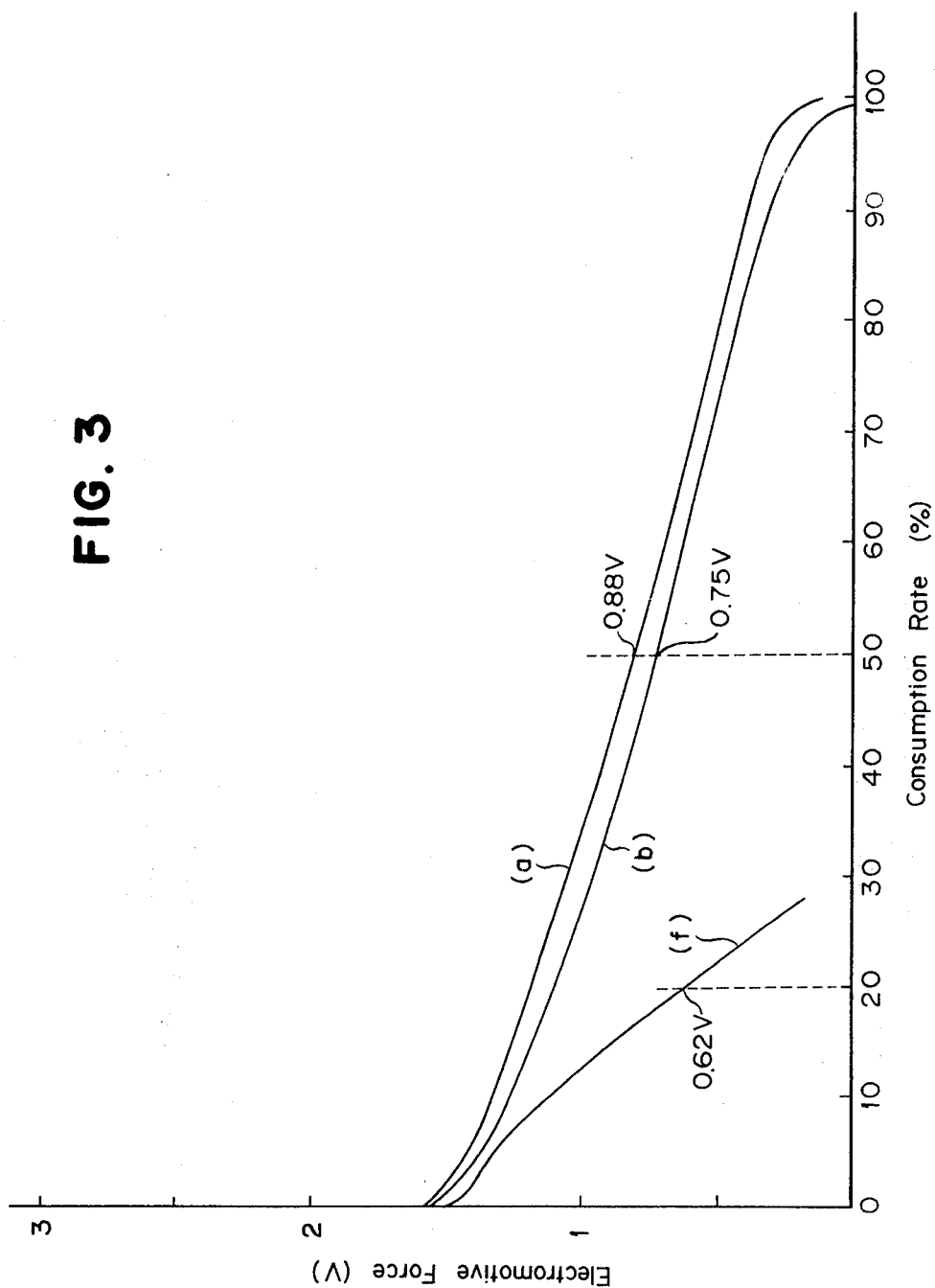

SOLID STATE LITHIUM CELL

BACKGROUND OF THE INVENTION

The present invention relates to a solid state lithium cell having a good discharge characteristic, and more particularly to an improvement of the cathode-active material for such a cell.

Reflecting a rapid progress of IC and LSI in the field of electronics in recent years, there is an increasing demand for highly dependable cells having a long useful life as a power source for such electronic devices which require a minimal electric current.

Under these circumstances, attention is drawn to a solid state cell having a construction in which a solid electrolyte having good ionic conductivity is sandwiched between a cathode-active material and an anode-active material, and which is highly dependable without a problem of liquid leakage.

As solid state cells of this type, there have already been known one wherein lead iodide ($PbI_2$) is used as the cathode-active material, lithium nitride ($Li_3N$) as the solid electrolyte and lithium metal (Li) as the anode-active material, or one wherein a mixture of $PbI_2$ and lead sulfide is used as the cathode-active material, a mixture of lithium iodide (LiI) or water-containing crystals of LiI ($LiI \cdot H_2O$, $LiI \cdot 2H_2O$ or $LiI \cdot 3H_2O$) and α-alumina or silicic acid anhydride ($SiO_2$) as the solid electrolyte, and metal lithium as the anode-active material. (U.S. Pat. No. 3,959,012)

It is considered that in such a cell, a reaction represented by $Li + \frac{1}{2}PbI_2 \rightarrow LiI + \frac{1}{2}Pb$ takes place as a whole, and the open circuit voltage (O.C.V.) is about 1.8 V. LiI formed by the reaction has lithium ionic conductivity to some extent and accordingly, the supply (to the cathode-active material) of lithium ion ($Li^+$) which transfers from the anode-active material (Li) via the solid electrolyte to the cathode-active material, continues without interruption, whereby the cell reaction proceeds as a whole.

However, in this case, $PbI_2$ constituting the cathode-active material has no adequate electronic conductivity, and accordingly, there has been a disadvantage in the form of a degradation of the discharge characteristic (particularly, a drop of the electromotive force as time lapses, i.e. short useful life) due to, e.g., an increase of the internal resistance. In order to increase the electronic conductivity of the cathode-active material, it has been common to add to $PbI_2$ an electronic conductor such as a powder of lead (Pb) or a powder of copper (Cu) or graphite which is nobler than Pb.

However, these electronic conductors have poor $Li^+$ conductivity, and accordingly their addition tends to lead to a hindrance of the transfer of $Li^+$ to the cathode-active material as a whole, whereby a smooth process of the cell reaction is hindered. Consequently, the cathode-active material sealed in the cell loses its function to receive $Li^+$ without being wholly consumed. Thus, the consumption rate of the cathode-active material decreases. In other words, there will be a substantial amount of the cathode-active material left unreacted by the cell reaction. Further, the addition of these electronic conductors results in an increase of the weight or volume of the cathode-active material, which in turn results in an increase of the total weight or volume of the cell, whereby the energy density or the power density of the cell decreases. Such a result is undesirable.

SUMMARY OF THE INVENTION

It is an object of the present invention to provide a solid state lithium cell which is free from the above-mentioned drawbacks inherent in the conventional solid state lithium cells in which $PbI_2$ is used as the cathode-active material. Particularly, it is intended to provide a solid state lithium cell in which $PbI_2$ capable of maintaining $Li^+$ conductivity and having an increased electronic conductivity and an increased consumption rate, is used as the cathode-active material.

According to the present invention, there is provided a solid state lithium cell having a cathode-active material layer, a solid electrolyte layer and an anode-active material layer, which is characterized in that the cathode-active material in said cathode-active material layer is a solid solution composed of lead iodide ($PbI_2$) and at least one element selected from the group consisting of bismuth (Bi), antimony (Sb), thallium (Tl), indium (In) and gallium (Ga).

BRIEF DESCRIPTION OF THE DRAWINGS

The present invention will be described below in more detail with reference to the accompanying drawings, in which;

FIG. 3 shows curves representing the relationship between the cathode-active material consumption rates and the electromotive forces, in respect of the cells shown in Example 4, when they were subjected to a forced discharge at 20 $\mu A/cm^2$.

DETAILED DESCRIPTION OF PREFERRED EMBODIMENTS

Figure 1:
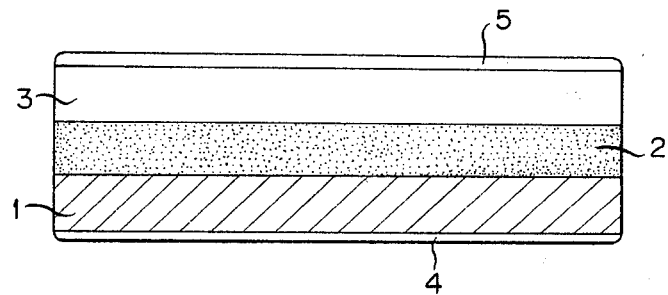
FIG. 1 is a schematic illustration showing a cross section of the solid state lithium cell.

Construction of the solid state cells according to the present invention is schematically illustrated in FIG. 1, in which the reference numerals 1, 2 and 3 are the layers of a cathode-active material, a solid electrolyte, and an anode-active material composed of lithium metal, respectively. Reference numerals 4 and 5 designate current collectors. It is characterized in the present invention that the cathode-active material is a solid solution composed of lead iodide ($PbI_2$) and at least one element selected from the group consisting of bismuth (Bi), antimony (Sb), thallium (Tl), indium (In) and gallium (Ga).

The cathode-active material of the present invention is the one in which at least one element, as a resistance lowering substance, selected from the group consisting of Bi, Sb, Tl, In and Ga is solid-solubilized as impurities in the crystal lattice of $PbI_2$. In contrast to the case wherein the conventional electronic conductor is mixed with $PbI_2$, in the cathode-active material of the present invention, the supply of $Li^+$ to $PbI_2$ is not hindered, and the electronic conductivity of $PbI_2$ is improved by the solid solubilization of an extremely small amount of the above-mentioned element, whereby it is possible to increase the total energy density or output density of the cell.

In addition to the above-grouped element(s) to be solid-solubilized in $PbI_2$, there may be mentioned tellurium (Te), Selenium (Se) and/or sulfur (S). However, the elements should preferably be selected from the above-mentioned five elements in order to obtain a desired result.

The amount of the solid-solubilized element is set to be not less than 1 ppm in an atomic concentration relative to $PbI_2$, and the upper limit is a limit of solid solubilization of the respective elements in $PbI_2$. If said amount is less than 1 ppm, the obtained solid solution has a little electronic conductivity, and such a low amount is accordingly undesirable.

The cathode-active material of the present invention is prepared in the following manner:

Predetermined amounts of a $PbI_2$ powder having a predetermined purity and a powder of the above-mentioned element are weighed and preliminarily mixed, and a powder mixture thereby obtained is heated at a temperature of at least the melting point of $PbI_2$ (i.e. 402° C.) to uniformly diffuse the above-mentioned element into $PbI_2$ crystal lattice. Then, the molten mixture is cooled and solidified, and the alloy thus obtained is pulverized. In this case, the entire melting reaction should preferably carried out in a sealed container in order to avoid sublimation of $PbI_2$. The elements to be solid solubilized, may be used in the form of simple substances. However, the respective iodides of Bi, Sb, Tl, In and Ga may be also used.

As a method for solid-solubilizing the above-mentioned element in $PbI_2$, the above-mentioned melting method is convenient in the sense that the reaction can thereby be done within a short period of time. However, it is not absolutely necessary to melt $PbI_2$, and it is also possible to employ a method wherein the above-mentioned powder mixture is heated at a temperature lower than the melting point for a long period of time, whereby the above-mentioned element is diffused in the solid body of $PbI_2$.

The cathode-active material of the present invention thus prepared may be used as it is or as a powder mixture incorporated with a further electronic conductor such as a Pb powder in order to further improve the electronic conductivity, whereby a solid state lithium cell of the present invention is constructed.

As the anode-active material for the lithium cell of the present invention, there may be used any material so far as it is capable of supplying $Li^+$. Usually, however, a thin plate or a powder of lithium metal is preferably used. Whereas, as the solid electrolyte, it is possible to use known types of $Li^+$ conductive solid electrolytes such as lithium nitride; a powder of lithium iodide, lithium iodide monohydrate, lithium iodide dihydrate or lithium iodide trihydrate; a powder mixture of two or more of these lithium iodide compounds; or a powder mixture composed of a powder of the above-mentioned lithium iodide compounds or a powder mixture thereof incorporated with at least one powder selected from α-alumina and silicic acid anhydride. Preferred is lithium nitride as it has a relatively great $Li^+$ conductivity.

The present invention will be described with reference to the following Examples.

EXAMPLE 1

(1) Preparation of the cathode-active material

Added to a $PbI_2$ powder having a purity of 99.9999% was 0.1% by weight (1000 ppm), based on said $PbI_2$ powder, of a $BiI_3$ powder having a purity of 99.99%. This mixture was placed in a high purity quartz tube, vacuumed and sealed, and then the whole was heated at 450° C. for 8 hours. After cooling, an ingot thereby obtained was pulverized, and the powder thereby obtained was used as a sample having $BiI_3$ content of 1000 ppm (Sample 1).

Then, a predetermined amount of a $PbI_2$ powder having a purity of 99.9999% was added to the above Sample 1 and mixed, and a powder mixture thus obtained was subjected to a heat treatment under the same conditions as above. Thus, solid solution powders having a Bi content of 100 ppm, 10 ppm and 1 ppm, respectively, were prepared. Added to the respective powders was 20% by volume of a Pb powder having a purity of 99.999%, whereby cathode-active materials of Sample 2 (Bi content of 100 ppm), Sample 3 (Bi content of 10 ppm) and Sample 4 (Bi content of 1 ppm) were prepared.

Further, 10% by volume of a Pb powder having a purity of 99.999% was mixed with a solid solution powder having Bi content of 1000 ppm to obtain a powder mixture, which is designated as Sample 5.

Furthermore, 20% by volume of a Pb powder having a purity of 99.999% was mixed with a $PbI_2$ powder having a purity of 99.9999% to obtain a powder mixture as a comparative example, which is designated as Sample 6. The powders used here had particle sizes which all passed through a sieve of 100 mesh (Tyler Standard Sieve).

(2) Preparation of a solid state lithium cell

Into a die cylinder having an inner diameter of 12 mm, which was placed in an argon dry box, firstly a copper foil having a diameter of 12 mm and a thickness of 0.2 mm was inserted as an electrode current collector, and then a powder of each of the prepared samples was placed thereon in an amount of about 0.25 g and gently pressed by a fluorine-contained resin rod. Further, 0.04 g of a lithium nitride powder, which passed through a sieve of 100 mesh (Tyler Standard Sieve), was placed thereon, and again pressed gently by a fluorine-contained resin rod. Then, a lithium foil having a diameter of 12 mm and a thickness of 0.5 mm was placed, and thereafter, a copper foil having the same specification as mentioned above was placed. The whole was compressed by a pressure of 4 ton/cm² for forming. An integrally formed solid type lithium cell was obtained. In this cell, the lithium nitride layer had a thickness of about 0.5 mm, and the cathode-active material layer had a thickness of about 0.6 mm.

On both sides of the obtained cell, lead wires were attached, and thereafter, the whole was coated with paraffin, whereby a cell for a characteristic test was obtained.

(3) Measurement of the discharge characteristic

Firstly, the open circuit voltages (O.C.V.) of the 6 cells thus obtained, were measured by a voltmeter having an imput resistance of 100 MΩ, whereby it was found that all of them had 1.8 V.

Then, a load of 1 MΩ was connected to each terminal, and each cell was continuously discharged. The results thereby obtained are shown in FIG. 2.

Figure 2:
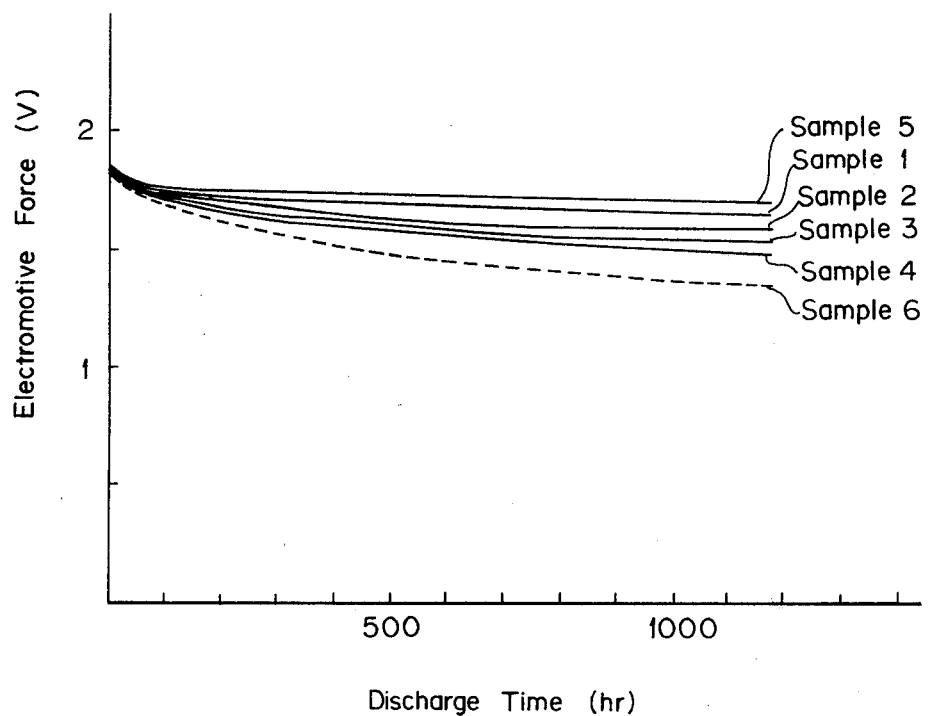
FIG. 2 shows curves comparing the decrease of the electromotive force of the solid state lithium cells according to the present invention (Samples Nos. 1 to 5) with that of a conventional solid state lithium cell (Sample No. 6), when they were subjected to discharge under a load of 1 MΩ.

As apparent from the FIG. 2, the solid state lithium cells in which the cathode-active materials of the present invention (Samples 1 to 5) were used, were found to show a smaller degree of decrease of the electromotive force with time lapse as compared with the conventional one (Sample 6) and thus have a superior discharge characteristic.

EXAMPLE 2

In the same manner as in Example 1, added to $PbI_2$ powders were predetermined amounts of $SbI_3$, $TlI$, $InI_3$ and $GaI_3$, respectively, thereby to obtain the respective solid solution powders. The predetermined amounts were such that Sb, Tl, In and Ga constitute 900 ppm as Pb substitution amount.

To these solid solution powders 20% by volume of Pb powder was mixed in the same manner as the method of preparation of Samples 1 to 4 and 6 in Example 1, whereby cathode-active materials were obtained as powder mixtures. Then, solid state lithium cells were prepared in the same manner as in Example 1. The discharge characteristics (500 hours) of these cells were measured in the same manner as in Example 1, whereby it was found that all cells had a superior discharge characteristic as compared with the cell of Sample 6 (Comparative Example), as was the case in Example 1.

EXAMPLE 3

LiI was dried in vacuo at 150° C. for 10 hours, and then it was pulverized to a powder which passed through a sieve of 100 mesh (Tyler Standard Sieve). The powder was further dried in vacuo at 150° C. for 10 hours. To the powder thereby obtained, 40 mol% of α-alumina which passed through a sieve of 100 mesh (Tyler Standard Sieve), was mixed, whereby a solid state lithium electrolyte was prepared. A cell was prepared in the same manner as in Example 1 with use of Sample 5 of Example 1 as the cathode-active material, and a lithium metal foil as the anode-active material. The open circuit voltage of this cell was 1.8 V. Further, a load of 1 Mφ was connected, and the discharge characteristic was measured for 300 hours, whereby it was found that the electromotive force drop was smaller than that of the cell of Sample 6, and thus this cell had a superior discharge characteristic.

EXAMPLE 4

(Comparative test)

With respect to a total of six cells, i.e. a cell in which Sample 1 of Example 1 was used as the cathode-active material, cells in which powder mixture of Example 2 composed, respectively, of Tl, Ga, In and Sb solid solutions incorporated with 20% by volume of a Pb powder, were used as the cathode-active materials, and a cell in which Sample 6 of Example 1 was used as the cathode-active material, a forced discharge of 20 $\mu A/cm^2$ was carried out by connecting the respective cells in series to a constant current power source, and a voltmeter having an internal impedance of 10 Mφ was connected in parallel to the respective cells to measure the electromotive forces of the cells at the time when the consumption rates of cathode-active materials of the respective cells reached 50%. The results obtained are shown in the following Table 1.

TABLE 1

| Test cells | Electromotive force at 50% consumption of cathode-active material — Electromotive force (V) |
|---|---|
| (a) Bi solid solution (Sample 1) | 0.88 |
| (b) Tl solid solution (Sample 1) | 0.75 |
| (c) Ga solid solution (Sample 1) | 0.72 |
| (d) In solid solution (Sample 1) | 0.80 |
| (e) Sb solid solution (Sample 1) | 0.85 |
| (f) Control (Sample 6) | <0 (0.62 at 20% consumption) |

For a better understanding of the above test results, a graphic showing is given in FIG. 3 in respect of (a) Sample 1 cell, (b) Tl solid solution cell and (f) Sample 6 cell.

In FIG. 3, the case where the cell reaction of $PbI_2 + 2Li \rightarrow 2LiI + Pb$ proceeded 100%, is represented as a consumption rate of 100%.

It is apparent from Table 1 and FIG. 3 that the cells of the present invention are capable of discharging until the cathode-active material has been completely consumed even in the case of the forced discharge of 20 $\mu A/cm^2$. Whereas, with the cell of the Sample 6, substantially zero when about 30% of the cathode-active material has been consumed.

We claim:

1. A solid state lithium cell comprising (a) a layer of a cathode-active material, (b) a layer of a solid electrolyte, and (c) a layer of an anode-active material comprised of a lithium metal, which are arranged in the order (a)-(b)-(c); wherein said cathode-active material comprises a solid solution comprised of lead iodide and a relatively very small amount sufficient to improve the discharge characteristic of the cell of at least one element selected from the group consisting of bismuth, antimony, thallium, indium and gallium and iodides thereof solid-solubilized as impurities in the crystal lattice of the lead iodide.

2. The solid state lithium cell according to claim 1, wherein the content of said element(s) in said lead iodide is not less than 1 ppm in an atomic concentration.

3. The solid state lithium cell according to claim 1 or 2, wherein said solid electrolyte comprises lithium nitride.

4. The solid state lithium cell as claimed in claim 1 or 2, wherein said solid electrolyte is a powder of lithium iodide, lithium iodide monohydrate, lithium iodide dihydrate or lithium iodide trihydrate; a powder mixture of at least two of these lithium iodide compounds; or a powder mixture composed of any one of the above powders incorporated with at least one powder selected from α-alumina and silicic acid anhydride.

5. A solid state lithium cell according to claim 1, wherein the content of said element(s) in said lead iodide is between 1 ppm in an atomic concentration and the limit of solid solubilization of the element(s) in lead iodide.

6. A solid state lithium cell according to claim 5, wherein the content of said element(s) in said lead iodide is up to about 1000 ppm.

7. A solid state lithium cell according to claim 1, wherein said element comprises bismuth, antimony, thallium, indium and gallium.

8. A solid state lithium cell according to claim 7, wherein said element comprises bismuth.

* * * * *